May 16, 1939.  H. B. KYRIAKIDES  2,158,188

INDEXING MECHANISM

Filed May 4, 1936  2 Sheets-Sheet 1

INVENTOR.
HARRY B. KYRIAKIDES
BY Flournoy Corey
ATTORNEY.

May 16, 1939.  H. B. KYRIAKIDES  2,158,188
INDEXING MECHANISM
Filed May 4, 1936   2 Sheets-Sheet 2

INVENTOR.
HARRY B. KYRIAKIDES
BY
Flournoy Corey
ATTORNEY.

Patented May 16, 1939

2,158,188

UNITED STATES PATENT OFFICE 2,158,188

INDEXING MECHANISM

Harry B. Kyriakides, Iowa City, Iowa

Application May 4, 1936, Serial No. 77,773

2 Claims. (Cl. 90—56)

My invention relates to indexing mechanisms and has particular relation to a built-in auxiliary mechanism which will indicate the number of turns made in either direction by a main indexing device or the number of units of space travel of the slide of a machine tool from a given reference point.

The operation of machining castings and the like is accomplished by various cutting machines such as planers, milling machines, drill presses and the like. In manipulating and operating these machines, the depth or extent of cut or the location of the cut is usually determined by means of an indexing mechanism which ordinarily comprises a base on which the work is mounted, a slide engaged for reciprocation with reference to the base which carries the cutting mechanism and a threaded shaft engaging the slide with the base and adapted by rotation of the shaft for regulating the position of the cutting device with reference to the work. In the usual construction of such machines, the thread on the shaft is accurately cut and is so chosen that the slide is advanced a certain definite space for each revolution of the shaft. A dial is usually secured to the shaft and is provided with indicia and a stationary pointer or mark for indicating the parts of a revolution through which the shaft is to be rotated to secure a certain portion of the advance of the slide through the unit space it would advance in one revolution of the shaft.

For instance, one revolution of the shaft might advance the slide one-half inch. The indicating dial or ring would then preferably be divided into five hundred divisions and if it was desired to move the slide one-one-thousandth of an inch, the dial would be rotated through one division or one five-hundredth of a revolution.

While this method of adjusting the slide is quite satisfactory where adjustment of less than one turn of the shaft is desired, adjustment of the slide for more than one turn of the shaft presents difficulties for the reason that it is difficult for the operator to keep track of the number of the revolutions made by the shaft.

Furthermore, it is the usual practice to use one portion of the work as a base line and strike a center line which is perpendicular to this base from which measurements to the point to be machined are made. These measurements may be on one side or the other of the center line and in turning the shaft to move the slide to the desired position on one or the other side of the center line another source of error is introduced.

I have accordingly devised a new and improved means for indicating the amount of movement a slide makes with reference to a beginning point and this means indicates exactly the number of revolutions made by the slide adjusting shaft and whether these movements are to one side or the other of a selected center line.

The space in which an auxiliary indexing mechanism may be mounted is sometimes very limited, and I have therefore also devised an auxiliary indexing mechanism which may be located within the standard of an adjusting device where it is out of the way and is protected from moisture or foreign matter and from mechanical injury.

I have also devised an indexing or indicating mechanism which is independent of and independently operated from the slide adjusting mechanism.

A general object of my invention is to provide a new and improved indexing mechanism.

A more specific object of my invention is to provide an indexing mechanism which will indicate the direction and number of revolutions made by the shaft of the slide-adjusting mechanism.

Another object of my invention is to provide a means for indicating whether the slide is to one side or the other of a center-line on the work and how far the cutting tool is from the selected center-line and its direction from the center-line.

Another object of my invention is to provide an auxiliary indexing mechanism which is disposed in the shaft engaging standard where it is protected from injury.

Still another object of my invention is to provide a device of the above character which will be simple and sturdy in construction and reliable, efficient and dependable in operation.

Other and further features and objects of the invention will be more apparent to those skilled in the art upon a consideration of the accompanying drawings and following specification, wherein is disclosed several exemplary embodiments of the invention, with the understanding, however, that such changes may be made therein as fall within the scope of the appended claims without departing from the spirit of the invention. The device may be used or adapted for use for other purposes.

While the indexing mechanisms here shown and described are used in connection with the table of a milling machine and the platen of a boring machine or the standard of a drill press, it is quite apparent that the device may be applied to or modified for use with other machine tools and may be used in connection with jigs and fixtures or in fact applied anywhere where it is desirable to indicate the relative motion of a slide or the like. The applications here shown and described are indicative only and the application of an indexing mechanism constructed according to my invention to any other machine tool is considered to be within the spirit and scope of my invention.

Figure 1:
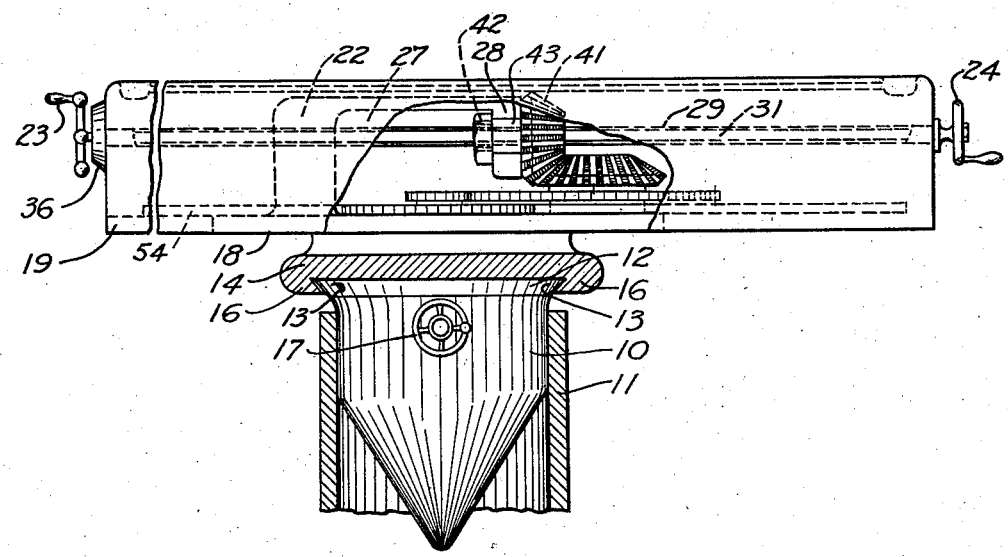
Figure 1 is an elevational view of a milling machine in which my auxiliary indexing device has been incorporated. A portion of the platen has been broken away to show the parts of the indexing device.
Figure 2:
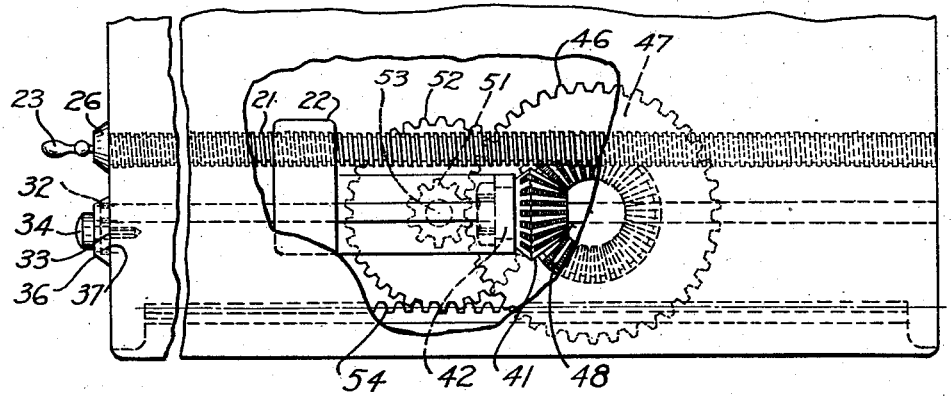
Figure 2 is a plan view of the milling machine shown in Figure 1 and, in this view also, portions of the platen have been broken away to show the parts of the gear mechanism which actuate the indexing device.

Referring now to the drawings and particularly to Figure 1 thereof, there is shown at 10, generally, the knee of a machine tool such as a milling machine. This knee is usually slidably attached for vertical motion on a supporting column 11 which is provided with a suitable base (not shown) adapted for supporting the machine. The knee 10 is provided with a plate 12 at its upper extremity having beveled outwardly-extending flanges 13 thereon.

A saddle 14 is provided with co-acting flanges 16 adapted to engage the flanges 13 of the knee 10 and the saddle is adapted to slide on the plate 12 and to be regulated by means of a hand wheel 17 in accordance with the usual machine tool construction.

The saddle 14 is provided with a transversely-extending plate 18 to which a platen 19 of rectangular block-like form, constructed in accordance with the usual machine tool practice, is slidingly engaged. The position of the platen 19 on the plate 18 is determined by a shaft 21 which is threaded through a suitable boss or standard 22 which in turn is secured to the plate 18. The shaft is adapted to be rotated by means of crossfeed wheels 23 and 24 at opposite ends of the platen. One or both of the wheels are provided with an indexing dial 26 having scribed marks about its periphery and so divided off as to indicate in thousandths of an inch or in any other convenient measure the relative travel of the platen 19 on the plate 18 as the shaft 21 is revolved.

The dial 26 indicates only the movement of the shaft 21 through 360 degrees, and if the shaft is revolved more than one turn the dial 26 will not indicate this fact nor will it indicate the number of revolutions of the shaft 21. I have therefore devised a mechanism which will indicate either the number of revolutions of the shaft 21 or the travel in inches or in any other desirable measure of the platen 19 with reference to the plate 18. A preferred structure utilizes an indicating or indexing device which will indicate the number of inches the platen has traveled plus or minus from a given central position.

One embodiment of the invention makes use of the standard 22 by providing it with a horizontally-extending arm 27 having a downwardly-extending flange 28 at the end thereof. A shaft 29 extends the length of the platen 19 in substantially the same manner as the shaft 21 and this shaft is likewise mounted for rotation within the platen. The shaft 29 is not threaded however, but is provided with a key-way 31 extending the length thereof. The shaft 29 projects out from the left end of the platen and is provided with a small pinion 32. A bolt 33 having an enlarged head 34 is threaded into the end of the platen and the bolt 33 acts as a shaft on which a dial 36 may be rotatably mounted. The dial 36 is provided with an internal gear 37 adapted to mesh with the pinion 32 on the end of the shaft 29 and the dial will accordingly be rotated by rotation of the shaft 29.

Rotation of the shaft 29 is accomplished by means of a pinion 41 which is mounted upon a shaft 43 slidingly engaged on the shaft 29 and the shaft 43 having a key adapted to slide in the keyway 31 to permit the nut 42 which holds the shaft 43 in place and the pinion 41 to slide longitudinally with reference to the shaft 29 but preventing relative rotation of the shaft, nut, and pinion on the shaft 29. The shaft 43 upon which the pinion 41 and the nut 42 are mounted is rotatably mounted in the depending flange 28 of the standard 22 and it is apparent that if the pinion 41 is rotated the shaft 29 and dial 36 will also be rotated.

A large spur gear 46 and a smaller ring gear 47 are rotatably mounted on a shaft 48 which is secured to the plate 18. A small spur gear 51 engages the large spur gear 46 and this spur gear and a second large spur gear 52 are mounted upon a second vertically-extending shaft 53 which is also mounted on the plate 18, all of the gearing being located within the platen 19. A gear rack 54 is mounted upon the inner side wall of the platen 19 at such a position as to engage the teeth of the spur gear 52. The gear ratio of the various gears may be of any desired value but are preferably so chosen that when the platen moves from one extreme position to the other, the dial 36 rotates through one complete revolution. The dial 36 may be marked with as many main divisions as there are units of travel for the platen or may be marked with other markings as desired as for instance with a number of marks corresponding to the number of revolutions the shaft 21 makes when the platen travels from one extreme position to the other.

The dial 36 is preferably marked with plus and minus divisions so that it will indicate the units of travel in one direction or the other of the platen from a given center mark.

Figure 5:
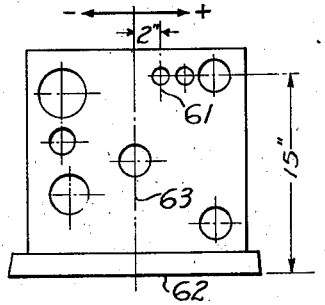
Figure 5 is a diagram illustrating the sequence of movement of the cutting tool as it is moved from one point to another to machine a work piece.

It is apparent that the operator of a milling machine or other device constructed according to my invention may fasten a work piece to the platen and use the handle 23 to move the table back and forth to determine the extent or location of the cut. If the handle 23 rotates more than one complete revolution, the number of revolutions plus or minus that the handle 23 has made will be indicated by the dial 36. For instance, if the indexing mechanism is to be used in connection with a drill press for drilling the various openings in a work piece such as shown in Figure 5, the work piece is clamped to the platen in accordance with well-known machine shop practice and the platen centered with respect to the plate 18.

If for instance, it is desired to drill a hole 61 in the block, which hole is fifteen inches from the finished face 62 of the work piece and two inches to the right of or in a plus direction from the center line 63 of the work piece, the handle 17 is rotated until the drill point is fifteen inches from the face 62 of the work piece. The handle 23 is then rotated in a clock-wise direction and the platen moves toward the left. The drill or other cutting tool, of course, remains stationary with regard to the base 11 and consequently is to the right of the center line 63. If one turn of the shaft 21 move the platen one-half inch, then the handle 23 should make four complete revolutions to cause the platen to move two inches toward the left. The operator of the machine is likely to become confused and not keep track of the number of revolutions of the handle 23, but since the movement of the platen causes the gear 52 to roll on the stationary gear rack 54, the shaft 29 is rotated by the gearing so as to rotate the dial 36 a number of divisions corresponding to the units of movement of the platen on the center line. In the present instance the dial 36 would move two complete divisions to indicate that the piece had traveled two inches with reference to the center line 63 of the work piece. If the threads on the shaft 21 were such as to cause it to rotate two complete revolutions for every inch of travel of the platen and the dial 36 were marked to indicate the number of revolutions, it would be found that the shaft 21 had rotated four times to cause the platen to move two inches. Consequently it would be a simple matter to cause the dial 36 to indicate the number of revolutions made by the handle 23 so that the operator would not lose count of the number of revolutions made. The dial may be marked like the dial shown in Figure 3 with plus or minus indicia to indicate whether the cutting tool is to the right or the left of a given center line on the work piece.

Figure 3:
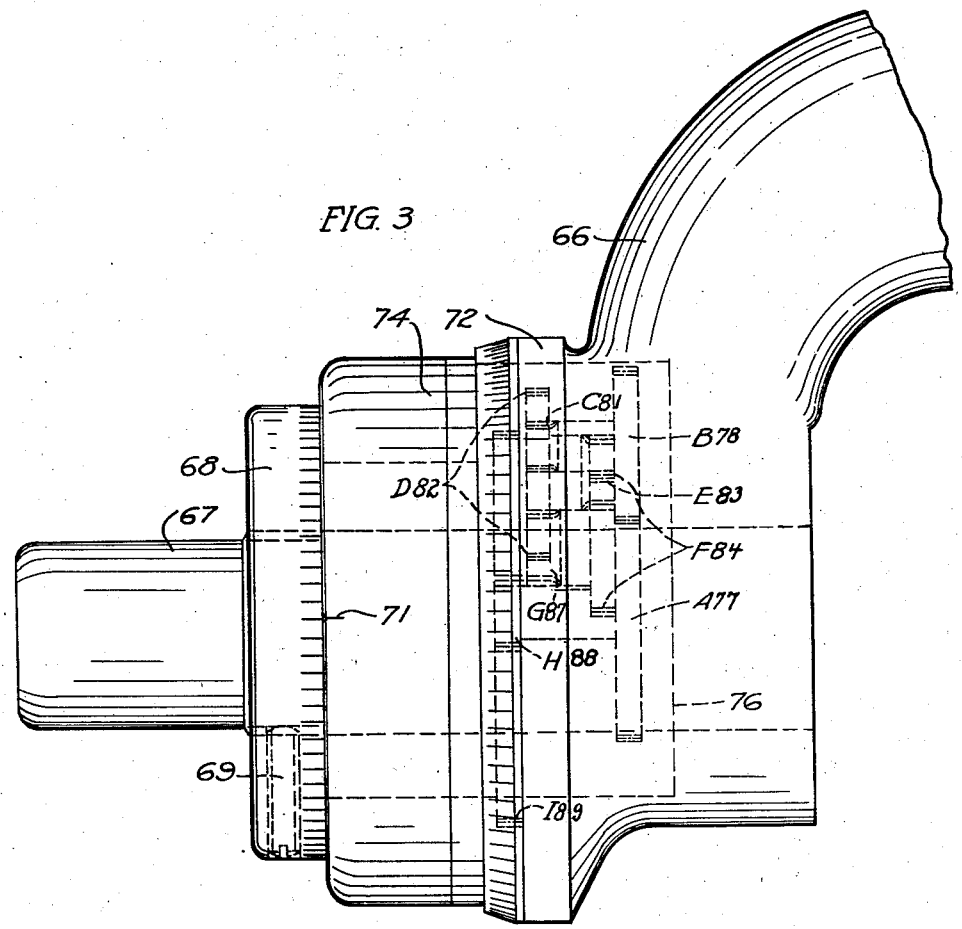
Figure 3 is a view in elevation of a portion of the standard of a machine such as a milling machine or a drill press and showing a modified form of my indexing device as it is mounted in the standard and on the shaft of the machine.
Figure 4:
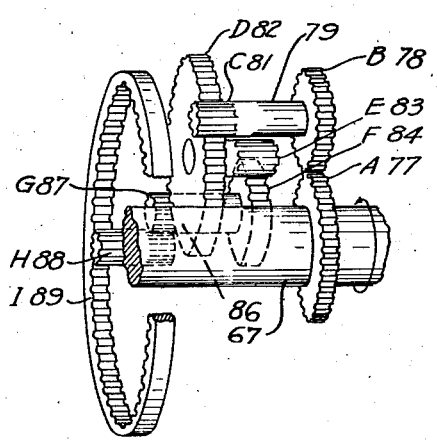
Figure 4 is a schematic diagram of the gear train employed for actuating my indexing device.

In a modified form of the invention shown in Figures 3 and 4, the gearing and the auxiliary dial are incorporated within a standard 66 such as is found on a milling machine or a drill press. The standard 66 may be in a horizontal position as shown or may be in a vertical position as it would be used with a drill press. A shaft 67 passes through the standard 66 and is threaded at some portion of its length so that it may pass through a suitable reference block or point such as a standard or the like on the slide or other movable part of the machine tool, or the standard 66 itself may be movable and the threads on the shaft 67 may engage a suitable threaded projection on the base. The structure by which movement of the slide or other movable part of the machine tool is secured is not the subject matter of the present invention and therefore need not be considered further.

The cylindrical dial 68 is preferably secured to the shaft 67 as by means of a set screw 69 and revolves with it. A mark may be placed at 71 on the standard 66 and the dial 68 divided to indicate thousandths of an inch. Consequently the degree of rotation of the dial 68 with reference to the reference mark 71 may be noted. A ring 72 engages the neck of the standard 66 and may be rotated with reference to it. The head or neck 74 of the standard 66 is hollowed out as shown at 76 and the gearing for rotating the ring 72 is located within this hollow space. A pinion gear A77 is located within the chamber 76 and is fastened directly to the shaft 67. This relatively large pinion is meshed with another pinion B78. This pinion B78 is mounted upon a shaft 79 and the shaft 79 is provided with teeth at C81 which are in turn meshed with a large pinion D82. The shaft E83 upon which the pinion 82 is mounted is provided with teeth and these teeth in turn mesh with a pinion F84. The pinion F84 is mounted on a shaft 86, the teeth G87 of which mesh with the teeth on a shaft H88. These teeth on the shaft H88 extend the entire length of the shaft and the shaft is so disposed as to engage the internal gearing I89, which is a part of the ring 72. It is plain to be seen that rotation of the shaft 67 and of the pinion 77 will cause rotation of the ring 72 and that the relative motion of the ring 72 on the standard 66 may be determined by the gear ratios employed. The ring 72 may be marked with plus or minus markings to show the units of travel of the slide or other movable part of the milling machine in either direction from a given center line.

It is apparent that by use of my invention the number of revolutions of the shaft 67 will be indicated by the ring 72 and that by use of this ring, it is an easy matter to determine with minute exactness the location of a cutting tool with reference to the center line of a work piece. By use of my indexing mechanism the ordinary milling machine, drill press or other machine tool may be used for quantity production work thus avoiding the use of an expensive machine and a high set-up charge for setting up such machines for quantity production work.

Although I have described several specific embodiments of my invention, it is apparent that modifications may be made by those skilled in the art. Such modifications may be made without departing from the spirit and scope of my invention as set forth in the appended claims.

I claim as my invention:

1. In an indexing mechanism, a goose-neck standard having a recess therein for the reception of gearing, a shaft passing through the goose-neck, an indicating ring mounted on the shaft the goose-neck standard having a mark thereon adjacent the first named ring a gear on the shaft and secured thereto and located within the recess in the goose-neck head a counter shaft on which are mounted a gear meshing with the first named gear and a pinion a second counter shaft having a gear and a second pinion said gear meshing with the first named pinion a third countershaft having a gear and a third pinion said gear meshing with the second pinion a fourth countershaft having two pinions one meshing with the third pinion, and a ring rotatably mounted on the outer side of the goose-neck standard and having an internal gear meshing with the pinion of the last named shaft, the outer face of the ring being beveled and provided with indicia on the beveled portion of the ring.

2. In an indexing device adapted for attachment to the rotating member of a feeding mechanism, a body having a recess therein for the reception of gearing, a means of attaching the body to a machine comprising a goose-necked bracket member, a rotating member passing through the body, a ring mounted on the shaft adjacent to the body, an index mark on the body, indicia on the ring, said ring indicative of the fractional part of a turn completed, a ring in the form of an internal gear mounted for rotation upon the body, indicia on the ring indicative of the total number of turns completed, the body having an opening therethrough to permit meshing of the internal gear with a gear train, a gear on the rotating member, and a train of reduction gearing within the recess and between the said gear and the internal gear.

HARRY B. KYRIAKIDES.